(12) United States Patent
Frank et al.

(10) Patent No.: US 10,677,577 B1
(45) Date of Patent: Jun. 9, 2020

(54) DEVICE AND METHOD FOR DETERMINING A DIAMETER

(71) Applicant: GAGEMAKER, LP, Pasadena, TX (US)

(72) Inventors: Jimmy I. Frank, San Antonio, TX (US); Kris Dawson, Pearland, TX (US)

(73) Assignee: Gagemaker, LP, Pasadena, CA (US)

( * ) Notice: Subject to any disclaimer, the term of this patent is extended or adjusted under 35 U.S.C. 154(b) by 104 days.

(21) Appl. No.: 15/940,959

(22) Filed: Mar. 29, 2018

Related U.S. Application Data

(60) Provisional application No. 62/478,395, filed on Mar. 29, 2017.

(51) Int. Cl.
*G01B 5/08* (2006.01)
*G01B 3/24* (2006.01)
*G01B 5/00* (2006.01)

(52) U.S. Cl.
CPC .............. *G01B 5/08* (2013.01); *G01B 3/24* (2013.01); *G01B 5/0004* (2013.01); *G01B 5/0009* (2013.01); *G01B 2210/40* (2013.01)

(58) Field of Classification Search
CPC ........ G01B 11/08; G01B 11/105; G01B 3/12; G01B 3/205; G01B 5/08; G01B 5/12; G01B 5/163; G01B 5/204
USPC ...................................................... 33/199 R
See application file for complete search history.

(56) References Cited

U.S. PATENT DOCUMENTS

| | | | |
|---|---|---|---|
| 129,349 A | 7/1872 | Kellogg | |
| 2,210,561 A | 8/1940 | Allen | |
| 2,911,725 A | 11/1955 | Sleigh | |
| 2,826,822 A | 3/1958 | Noviant | |
| 2,874,475 A | 2/1959 | McGaffey | |
| 2,943,394 A | 7/1960 | Schabot | |
| 3,090,126 A | 5/1963 | Kernoski | |
| 4,148,146 A | 4/1979 | Holland | |
| 4,189,843 A | 2/1980 | Baldwin | |
| 4,202,109 A | 5/1980 | Schasteen | |
| 4,524,524 A * | 6/1985 | Frank ................. | G01B 5/12 33/199 R |
| 4,567,670 A * | 2/1986 | Roulstone ........... | G01B 5/204 33/199 R |
| 4,700,484 A | 10/1987 | Frank et al. | |

(Continued)

OTHER PUBLICATIONS

Gagemaker, LP, Gagemaker MRP for Pin, May 20, 2011, YouTube http://www.youtube.com/watch?v=zAi0qLGdB_A.

*Primary Examiner* — Yaritza Guadalupe-McCall
(74) *Attorney, Agent, or Firm* — McAughan Deaver PLLC

(57) ABSTRACT

A metrological instrument configured to measure diameters comprises one or more guide rails, a plurality of clamping blocks configured to removably or releaslably securely locate the blocks on the one or more guide rails, and also configured to removably or releaslably securely clamp a measurement arm substantially normal to the one or more guide rails. A displacement transducer, such as a dial indicator or a digital indicator, may be disposed at an end of one or more of the measurement arms for determining a displacement, relative or absolute, between the measurement arms. To provide the required measurement accuracy, precision, and repeatability, the instrument may be configured with carbon fiber reinforced composite guide rails, and/or measurement arms.

19 Claims, 12 Drawing Sheets

(56) References Cited

U.S. PATENT DOCUMENTS

| | | | | |
|---|---|---|---|---|
| 4,947,555 | A | * | 8/1990 | Allen, III ................. G01B 3/36 33/199 R |
| 5,020,230 | A | * | 6/1991 | Greenslade ............. G01B 3/48 33/199 R |
| 5,182,862 | A | * | 2/1993 | Frank ..................... G01B 5/204 33/199 R |
| 6,145,207 | A | | 11/2000 | Brunson |
| 7,328,520 | B2 | * | 2/2008 | Galle, Sr. ................ G01B 5/08 33/783 |
| 9,752,427 | B2 | | 9/2017 | Douglas et al. |
| 10,254,099 | B1 | | 4/2019 | Frank et al. |
| 10,436,015 | B2 | | 10/2019 | Douglas et al. |
| 10,436,564 | B2 | | 10/2019 | Douglas et al. |
| 2019/0145749 | A1 | | 5/2019 | Thomas et al. |

\* cited by examiner

DEVICE AND METHOD FOR DETERMINING A DIAMETER

CROSS REFERENCE TO RELATED APPLICATIONS

This application claims benefit of and priority to U.S. Provisional Application Ser. No. 62/478,395 filed on Mar. 29, 2017, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein are directed to metrological instruments for determining or measuring diameter, differential diameter, and/or ovality of a product having a generally circular cross section.

Description of the Related Art

Products having generally circular cross sections, such as, but not limited to threaded oilfield tubular products, may exhibit a variety of diametrical dimensions at a given axial and/or circumferential location. Such diametrical variations may result in undesired ovality or other types of unwanted dimensional variations. For threaded products, such dimensional variation may adversely affect the sealing or locking ability of the thread system. Threaded product manufacturers typically specify a diametrical tolerance or acceptable run-out for their thread systems.

FIG. 1 illustrates a prior art device 100 used to measure the difference in diameters, such as crest diameter, of a threaded product 102 at one or more fixed distances along the thread system. Measurements indicated on the dial indicator 104 may be taken or made at multiple locations around the clock face, such as, for example, 12 to 6 o'clock, and 3 to 9 o'clock. The difference or variation among such measurements is an indication of ovality or deviation from a true circle. The prior art gage 100 depicted in FIG. 1 is an MRP® gage available from Gagemaker, LP, Pasadena, Tex. The entire contents and disclosure of U.S. Pat. No. 4,524,524, owned by a predecessor to Applicant and encompassing the depicted MRP® gage, is incorporate herein by reference for all purposes.

Rigidity or stiffness of the gage 100 and alignment of its components affect directly the accuracy, precision, and repeatability of the measurements that can be made. For at least these reasons, prior art gages, such as shown in FIG. 1, are typically made from alloy steel or other metal systems, as such materials provide adequate stiffness and are readily machinable to the required tolerances and shapes. However, at least in the oil and gas industry, tubular or circular products may have diameters ranging up to 24 inches and beyond. Prior art gages for these large products manufactured using steel or other metal systems are heavy and unwieldy for the operator. The weight of the gage alone may adversely affect the user's ability to measure the product accurately and repeatably. In addition, the weight of the gage itself can adversely affect its accuracy, precision and/or repeatability, especially when the weight of the gage is carried by, for example, the upper measurement arm 106, as illustrated in FIG. 1. For example, the weight of the gage 100 can caused unwanted deflections in one or more of the measurement arms 106, 108 and unwanted deflection of one or more of the guide rails.

The inventions disclosed and taught herein are directed to metrological instruments configured to provide suitable rigidity over a wide range of sizes, and to reduce or eliminate undesirable deflections and/or measurement errors caused by the weight of the gage.

BRIEF SUMMARY OF THE INVENTION

As a non-limiting summary of one of many possible embodiments encompassing inventions disclosed herein, a metrological instrument may comprise at least one cylindrical guide rail fabricated from carbon fiber reinforced composite and having an outside surface that varies in a particular dimension no more than about 0.002 inch along the length; first and second measurement blocks each having an aperture there through configured to receive the at least one guide rail, and each block having associated therewith a wear pad, the two wear pads defining a contact plane; a guide rail retention mechanism associated with each block and configured to secure the block to the at least one guide rail at a desired position without causing irreversible damage to an outside surface of the guide rail or causing permanent variation to the particular dimension; a measurement arm aperture in each block configured to receive a measurement arm in substantially normal orientation to the contact plane; a measurement arm located in each measurement arm aperture; a measurement arm retention mechanism associated with each measurement arm aperture and configured to secure the measurement arm to the block at a desired position; and at least one dimensional indicator associated with an end of at least one measurement arm.

As a non-limiting summary of another one of many possible embodiments encompassing inventions disclosed herein, a device for measuring a diameter of a product may comprise a pair cylindrical guide rails fabricated from carbon fiber reinforced composite and having a ground outside surface that varies in diameter no more than about 0.002 inch along the length; first and second measurement blocks each having apertures there through configured to receive the pair of guide rails; a wear pad associated with each measurement block; a guide rail retention mechanism associated with each measurement block and configured to secure the block to the pair of guide rails without causing irreversible damage to the guide rail; a measurement arm aperture in each block configured to receive a measurement arm in substantially normal orientation to the contact plane; a measurement arm located in each measurement arm aperture; a measurement arm retention mechanism associated with each measurement arm aperture and configured to secure the measurement arm to the block at a desired position; and a measurement shoe associated with a distal end of one measurement arm; and a dimensional indicator associated with the other measurement arm and configured to determine a dimension between the measurement shoe and the other measurement arm.

While other summaries of embodiments encompassing inventions disclosed herein re possible, such additional summaries are not considered necessary for the understanding of the inventions disclosed herein.

BRIEF DESCRIPTION OF THE SEVERAL VIEWS OF THE DRAWINGS

The following figures form part of the present specification and are included to demonstrate further certain aspects of the present inventions. The inventions may be better understood by reference to one or more of these figures in combination with the detailed description of selected specific, but non-limiting, embodiments presented herein.

Figure 1:
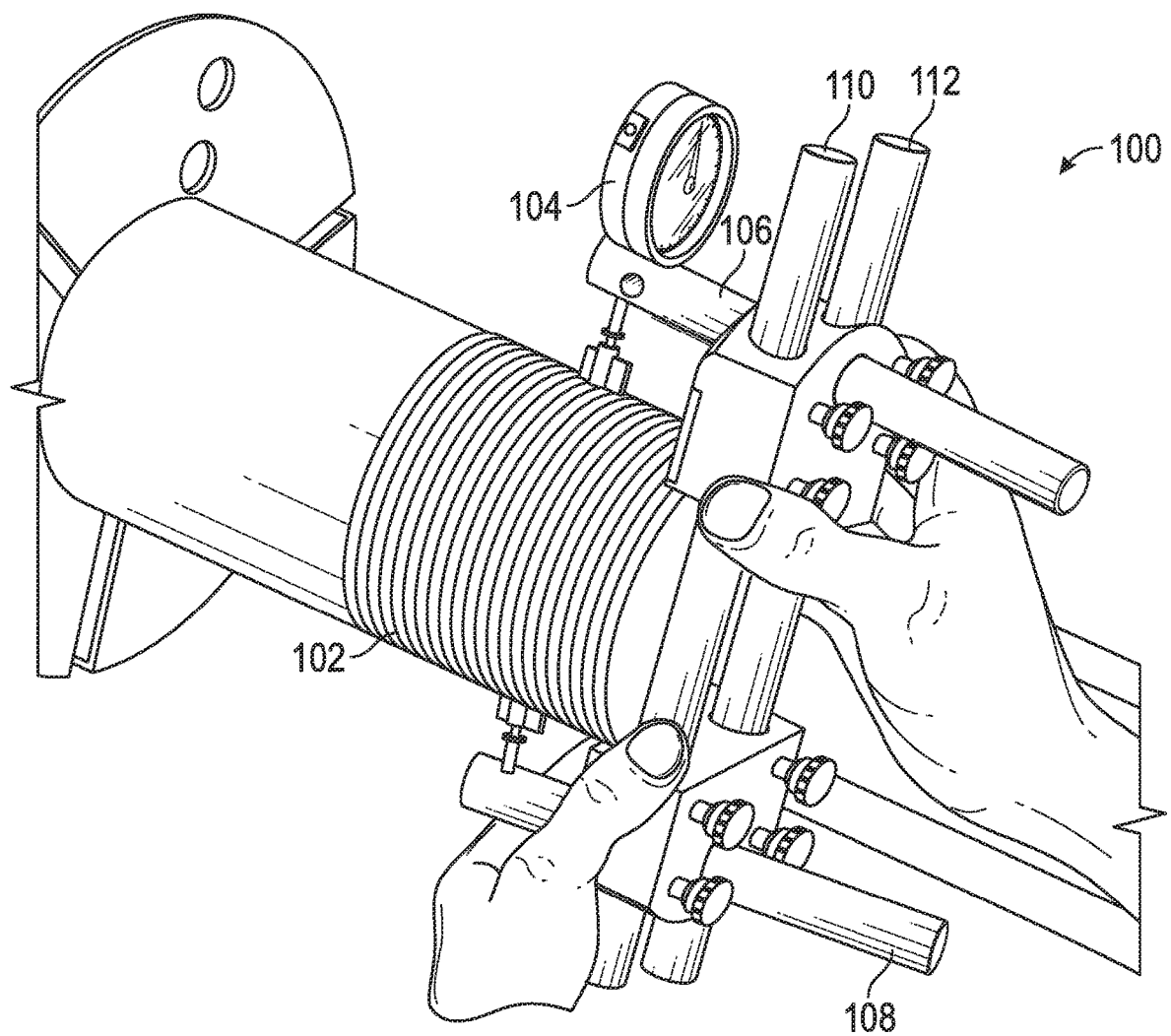
FIG. 1 illustrates prior art.

While the inventions disclosed herein are susceptible to various combinations, modifications and alternative forms, only a few specific, non-limiting embodiments have been shown by way of example in the drawings and are described in detail below. The figures and detailed descriptions of these specific embodiments are not intended to, and shall not, limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

With reference to FIGS. 2-10, we have created a metrological instrument useful for determining internal and/or external diameters of manufactured product. In its simplest form, the instrument comprises one or more guide rails, a plurality of clamping blocks configured to removably or releasably securely locate the block on the one or more guide rails, and also configured to removably or releasably securely clamp a measurement arm substantially normal to the one or more guide rails. A displacement transducer, such as a dial indicator or a digital indicator, may be disposed at an end of one or more of the measurement arms for determining a displacement, relative or absolute, between the measurement arms. To provide the required measurement accuracy, precision, and repeatability, the instrument may be configured with carbon fiber reinforced composite guide rails, and/or measurement arms.

Use of carbon fiber reinforced composite materials, rather than conventional steel or metal guide rails and arms, reduces the overall weight of the instrument, without sacrificing rigidity. For example, most steel alloy systems have specific strengths (i.e., the ratio of tensile strength to density) of less than 100,000 Nm/Kg even the lightest metallic systems (e.g., titanium) have specific strengths of less than 260,000 Nm/Kg. In contrast, carbon fiber reinforced composite systems tend to have specific strengths greater than 300,000 Nm/Kg, and can exhibit specific strengths above 700,000 Nm/Kg. Similarly, composite systems, such as carbon fiber systems, exhibit specific stiffnesses (i.e., the ratio of modulus to density) greater than metallic systems. The inventions disclosed herein, however, are not founded on merely substituting one material for another. Rather, the inventions comprise, among other things, the combination of lightweight, yet rigid guide rails and/or measurement arms that have been precision manufactured or otherwise fabricated to have a dimensional variation of no more than about ±2 mil (0.002 inch), and preferably no more than about ±1 mil (0.001 inch), along their axial length, and clamping blocks configured to secure measurement arms in predetermined measurement locations along the guide rails without irreversibly damaging the guide rails. The weight reduction and stiffness achieved by the combinations disclosed herein allow users of the instrument to make accurate, precise, and repeatable measurements on product of all sizes without induced errors caused by the weight of the instrument.

Figure 2:
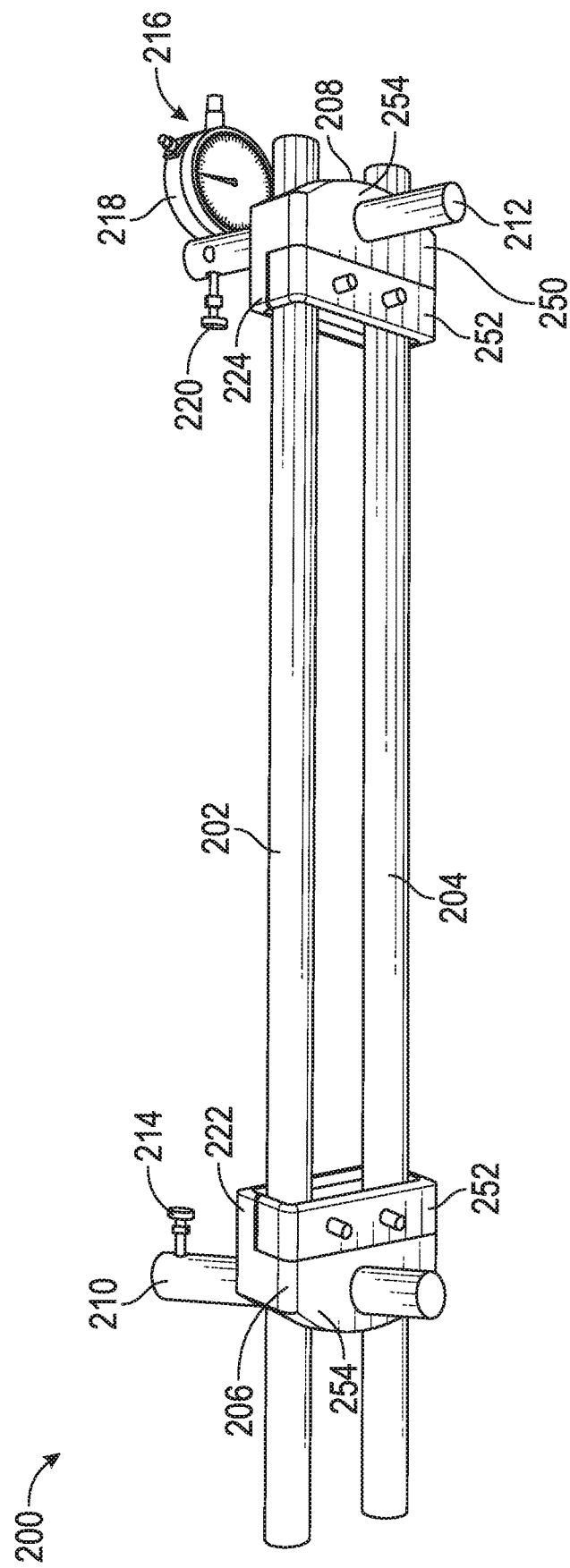
FIG. 2 illustrates a lightweight, yet rigid measurement gage according to one or more aspects of the inventions disclosed herein.
Figure 3:
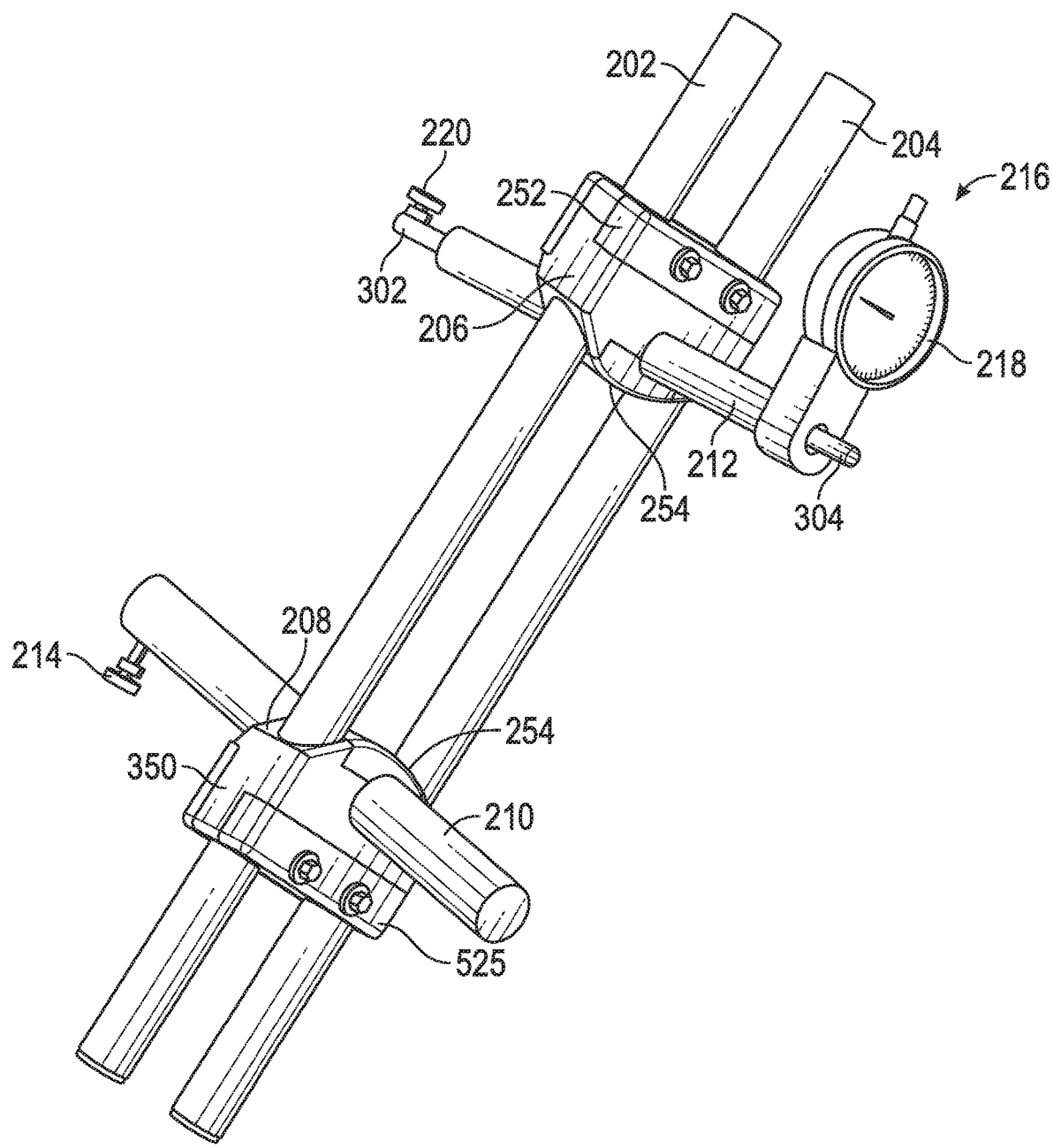
FIG. 3 illustrates another embodiment of a lightweight, yet rigid measurement gage according to one or more aspects of the inventions disclosed herein.

Turning now to FIGS. 2 and 3, a first embodiment of the invention is shown as an external diameter gage 200 and an internal diameter gage 300. These particular embodiments comprise two guide rails 202 and 204. Each guide rail 202, 204 is preferably a hollow carbon fiber tube having a precision ground diameter along its axis of, for example, 0.875 inch±0.001 inch. In these embodiments, the wall thickness of the guide rails, 202, 204 are substantially the same. First and second measurement blocks 206 and 208 are shown located on the guide rails 202 and 204 in predetermined locations. Protruding from the measurement blocks substantially normal to the guide rails 202 and 204 are measurement arms 210 and 212. Generally, the measurement arms 210, 212 are substantially perpendicular to a plane formed by the guide rails 202, 204. For illustration only, if the guide rails define the Y-axis, the measurement arms are perpendicular thereto and extend along the X-axis. For certain products, the measurement arms may be angled in the X-axis plane to accommodate, for example, an angle of taper without having to move the position of the measurement blocks on the guide rails as the axial depth of measurement is changed. Angled measurement arms are particularly useful for embodiments of the invention that are used with tapered threading systems. For purposes of this disclosure, "substantially normal" is used to include measurement arms that are perpendicular to the guide rails as well as measurement arms that are angled to the plane of the guide rails.

In these embodiments, the measurement arms may be fabricated from a stainless steel, rather than a composite system like the guide rails, 202 and 204. As will be discussed below, the measurement arms 210, 212 could be fabricated from a composite system as well. Measurement arm 210 comprises a shoe configured to create a diametrical datum on the product to be measured. Measurement arm 212 comprises a displacement measurement system 216 including a dial indicator 218 and a measurement shoe 220. Measurement blocks 206 and 208 also may comprise axial datum faces 222 and 224 configured to engage or contact the product at known locations to establish the desired location on the product from which a diameter measurement may be taken.

For example only, and not for limitation, if the product is a threaded tubular product, such as oilfield tubing, a standard (not shown) may be used to set the locations of the measurement blocks 206 and 208, and the position of the measurement arms 210 and 212, so that the dial indicator registers, for example, zero displacement at the designed dimension for the product at a particular location. The instrument 200, 300 may then be located on the product such that the axial datum faces register against the product, e.g., a tubular pin end, and reading(s) from the dial indicator may be obtained. In this embodiment, the dial indicator will measure the difference between the product diameter at that location on the product and the standard. The instrument can be rotated, for example 90 degrees clockwise, and another measurement taken. The positions of the measurement arms can be adjusted, and additional measurements at different location on the product can be made.

Because the instrument 200, 300 likely will make repeated contact with metallic or other hard products, the inventions may also comprise one or more replaceable wear pads associated with each measurement block 206, 208. It will be appreciated that during use, the wear pads contact the end of the product (see, e.g., FIG. 7) and because several measurements may be made at various clock positions, the wear pads are subject to erosive wear and need to be periodically replaced. The wear pads may be fabricated from a hardenable metal alloy, such as carbon steel, stainless steel and the like. However, metallic wear pads may become magnetized over time, thereby collecting filings and other metal particles that could interfere with a measurement. Thus, it is preferred that wear pads 222, 224 be fabricated from non-metallic systems including, for example, phenolics, acetals, polytetrafluoroethylenes, ultra-high molecular weight polyethylenes (UHMWPE), nylons, polyimides, polysulfones and polyphenylene sulfides, and be configured to be replaceable.

In FIG. 3, measurement arm 212 is illustrated to have an interior cavity through which a measurement lever 302 extends. At one end of the lever is the measurement shoe 220 and at the other end is dial indicator 218. In this embodiment, the dial indicator is always adjacent the operator, regardless of the axial position of the measurement arm 212. The lever 302 has a pivot point within the measurement arm 212 about which the lever rotates. For example, the lever 302 may be pinned (not shown) to the measurement arm 212 at about the midpoint, such that the lever 302 rotates about the pin up and down substantially parallel to the guide rails. Because the embodiment of FIG. 3 is configured as an internal diameter gage, it is preferred that the measurement shoe 220 be biased in the outward (e.g., up) direction. A biasing element, such as a spring or resilient member, may be used for this purpose. With this biasing structure, a user can move the indicator end of the lever 304 in a first direction (e.g., up) which causes the shoe to move in the opposite direction (e.g., down) against the bias. The instrument 300 can be placed against the product in the measurement position, and then the lever 304 released. The bias element will cause the measurement shoe 220 to engage the product and a diameter measurement may be taken. The lever end 304 can again be moved in the first direction and the gage 300 repositioned for another measurement.

Figure 4A:
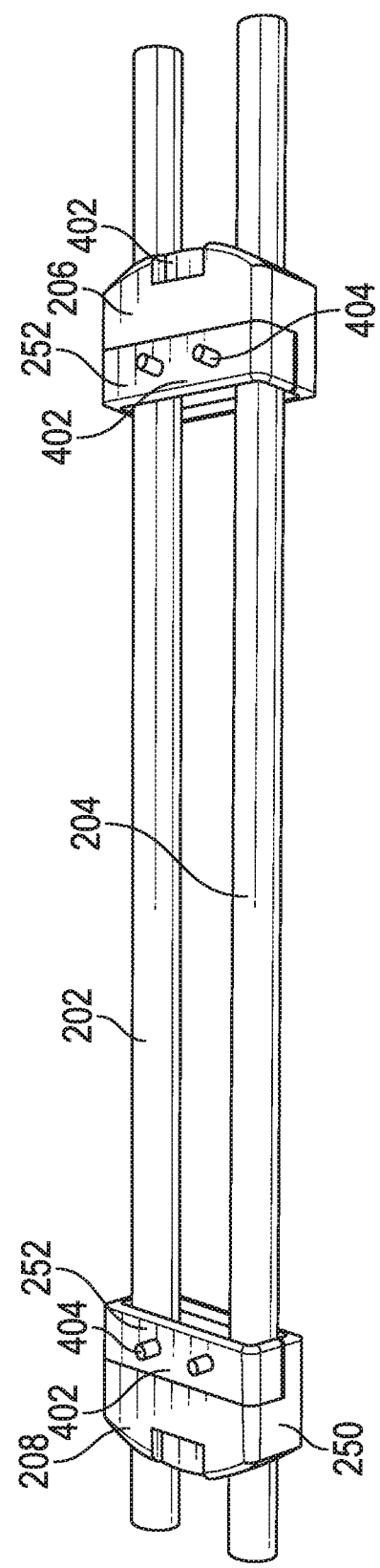
FIG. 4A illustrates lightweight, yet rigid guide rails and clamping blocks according to one or more aspects of the inventions disclosed herein.
Figure 4B:
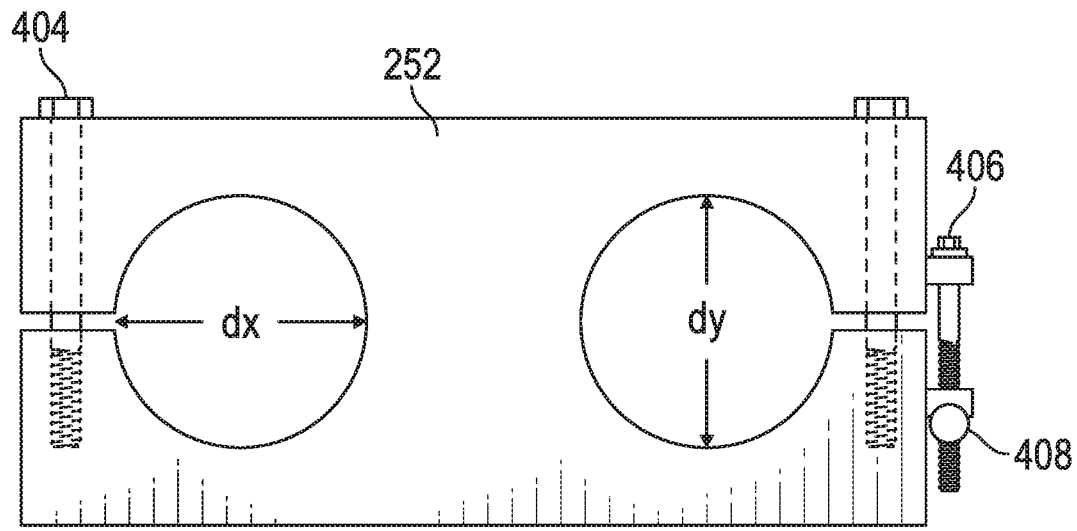
FIGS. 4B and 4C illustrate two of many possible embodiments of clamping blocks useful with the inventions disclosed herein.
Figure 4C:
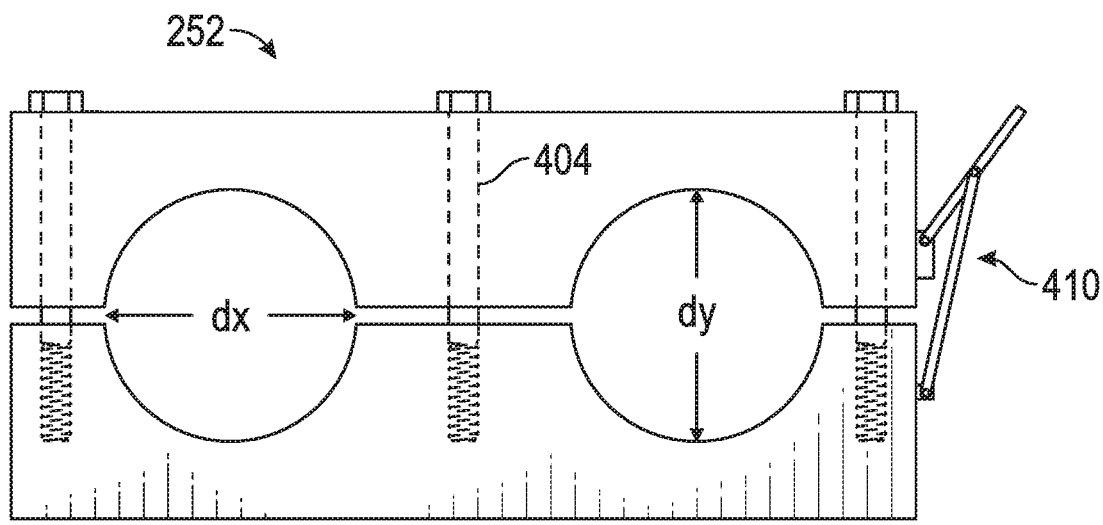

Turning to FIGS. 4A through 4C, the measurement blocks 206 and 208 shown in FIGS. 2 and 3 may comprise a body 250 and a guide rail clamp system 252. As illustrated in FIG. 4A, the guide rail clamp system 252 may comprise a separate shell member 402 configured to clamp the guide rail 202, 204 between the body 250 and the shell 402. As shown in FIG. 4A, the clamping force may be provided by one or more threaded fasteners, such as bolts 400, which are threadingly received by body 250. It is preferred that the clamping force exerted on the guide rail 202, 204 be spread about most, if not all, of the circumference of the guide rail outer surface. It is desirable not to cause plastic or irreversible deformation to the guide rail 202, 204 or outer surface in an amount that will affect the overall diametrical dimensions of the guide rail. For example, any irreversible deformation or damage caused by the clamp system preferably should be within the diametrical tolerance of the guide rail, e.g., within ±0.001 inch.

FIGS. 4B and 4C illustrate other possible guide rail clamping systems 252. FIG. 4B illustrates a one piece clamping system and FIG. 4C illustrates a two-piece clamping system. In both embodiments, if, for example, the diameter of the carbon fiber guide rail 202, 204 is 0.875 inch±0.001 inch, the guide rail clamp system 252 may have a relaxed or nominal inside diameter of, for example, 0.880 inch, or about 1 to about 5 mils larger than the nominal diameter of the guide rail 202, 204. For the embodiments illustrated in FIGS. 4B and 4C, the "$d_x$" dimension may be 0.880 inch. When the compression mechanism is engaged about the carbon fiber guide rail, the "$d_y$" dimension may compress, distort, or change to less than the 0.880 inch dimension, and preferably to at least the nominal diameter of the guide rail (e.g., 0.875 inch). Preferably, the "$d_y$" dimension may compress to less than nominal diameter of the guide rail, such as in the example, to 0.874 inch or 0.873 inch to clamp or retain the carbon fiber guide rail in the measurement block 208, 210. Regardless of the specific structure of the clamping system, a compression factor or interference from about 0% to up to about 2.4% of the nominal guide rail diameter may be used. It will be appreciated that depending on the amount of compression induced, the compression mechanism may cause the shape of the guide rail within and perhaps immediately adjacent the retention mechanism to change from substantially circular to, perhaps, oval. It is desirable, however, not to cause plastic or irreversible deformation to the guide rail or guide rail surface in an amount that will affect the overall diametrical dimensions of the guide rail. For example, any plastic deformation caused by the compression mechanism preferably should be within the diametrical tolerance of the guide rail, e.g., within ±0.001 inch.

The clamping force may be provided by any convenient means, including threaded fasteners such as bolts 404, bolt and nut combinations, such as bolt 406 and barrel nut 408, or lever lock 410. It will be appreciated that while the embodiments illustrated in FIGS. 4B and 4C illustrate each of these clamping members, not all are needed on any give clamp assembly 252. It is preferred that the clamping force be provided by an easy to implement system, such as a snap lock or lever, so that repeatable compression can be provided in a quick and easy manner.

Although the previous embodiments utilized round guide rails 202, 2014, and round measurement arms 210, 212, shapes other than circular may be used with these inventions. Square, rectangular, triangular, I-beam, T-beam and other shapes or cross-sections may be used. For example, but not limitation, 1.000 inch square-shaped carbon fiber guide rails may be used with a compression mechanism having 1.0825 inch nominal openings, as discussed above with respect to circular guide rails. Measurement arm shapes other than round can be self-aligning. In other words, because the measurement arms comprise measurement shoes, it is important that the plane formed by the shoes is correctly oriented, such as, as parallel to the wear pads. For round measurement arms fabricated from carbon fiber composite, a tongue and groove system with the measurement block is preferred to maintain alignment. A groove can be cut into the measurement arm, and a tongue formed in the measurement block. However, cutting a groove or notch into the measurement arm may compromise the structural integrity of the arm. More preferably, a tongue is applied or mounted on the measurement arm and a corresponding groove is formed in the measurement block.

As discussed above, rigidity or stiffness of the instrument during all aspects of use is desirable for accurate, precise, and repeatable measurements. Thus, for embodiments in which the measurement arms are fabricated from a carbon fiber composite, the upper measurement arm (for example, arm 210 in FIG. 7) may have a greater wall thickness than the lower measurement arm. It will be appreciated that the upper measurement arm (during a measurement in which the instrument is oriented vertically) will carry most if not all of the weight of the instrument. By making the upper measurement arm stiffer (e.g., having a greater wall thickness), unwanted deflections caused by the weight can be minimized or eliminated.

Figure 5:
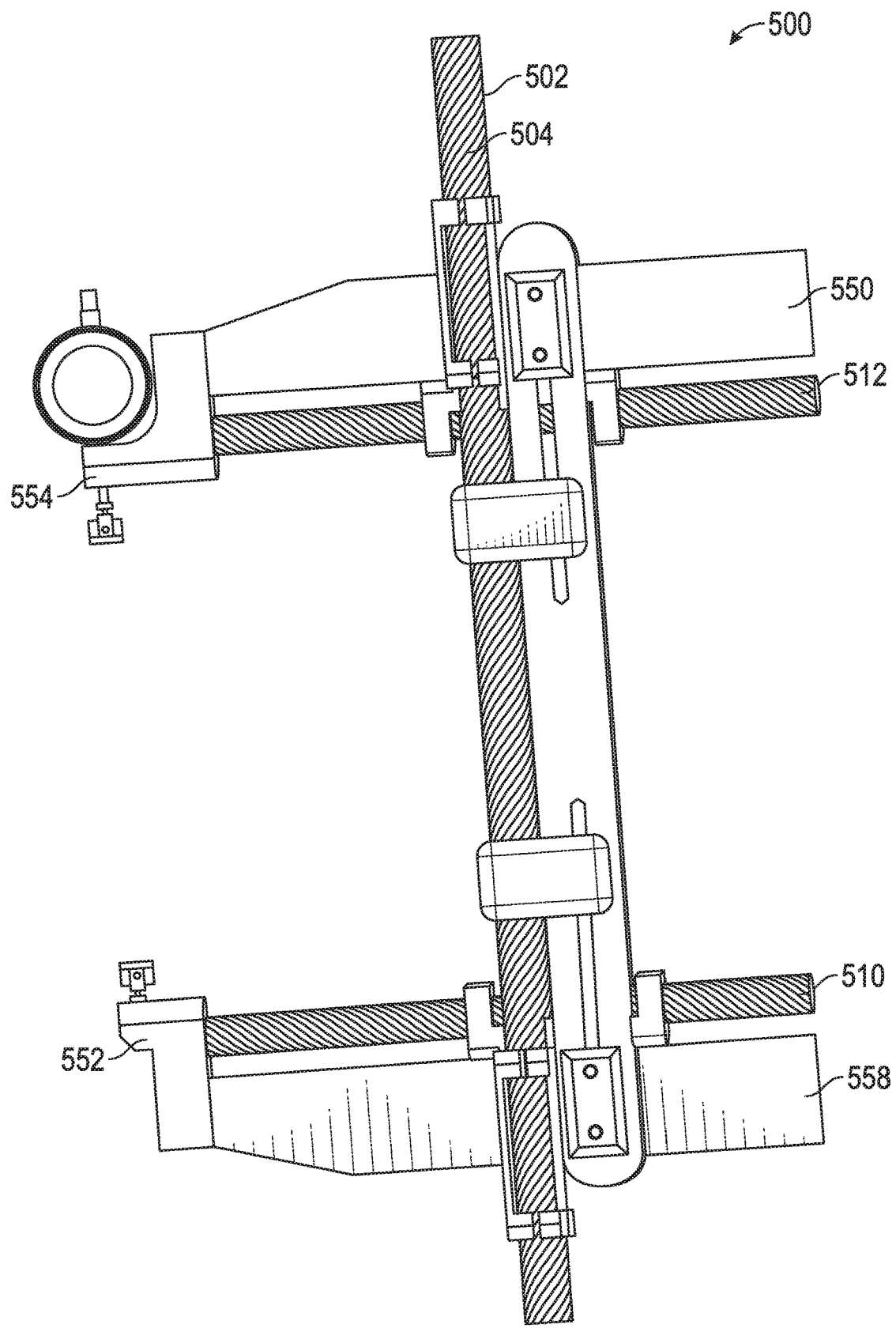
FIG. 5 illustrates another embodiment of a measurement gage according to one or more aspects of the inventions disclosed herein.
Figure 6:
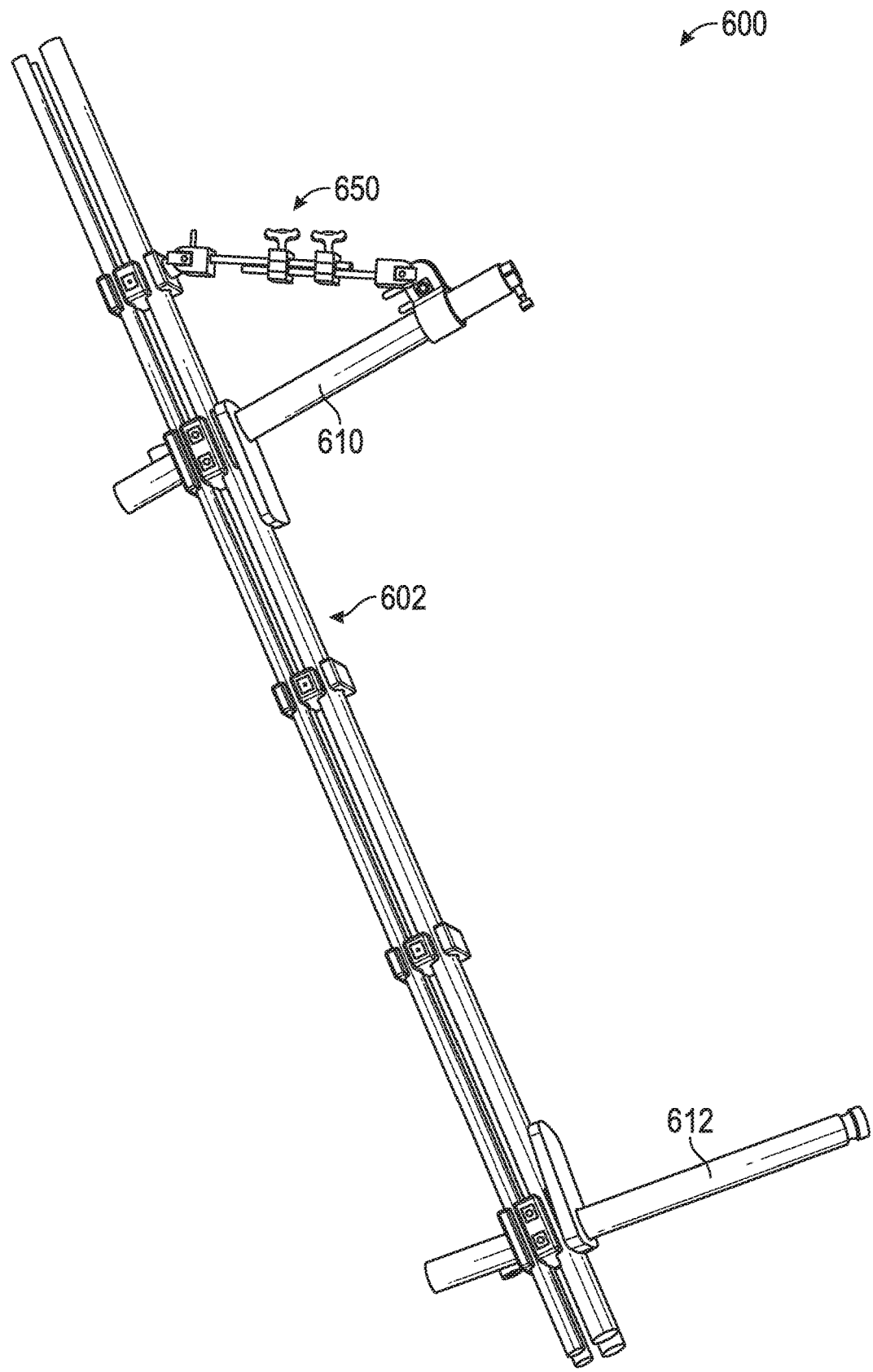
FIG. 6 illustrates another embodiment of a measurement gage having and adjustable measurement arm brace according to one or more aspects of the inventions disclosed herein.

In addition, the inventions also contemplate the use of one or more measurement arm braces or stiffeners to add rigidity to the measurement arms for large diameter products and/or large axial displacement measurements. For example, FIGS. 5 and 6 illustrate embodiments comprising a measurement arm brace or stiffeners that may be integral to the instrument or may be an accessory or add-on for use with large diameter or large axial displacement measurements. The embodiment of FIG. 5 comprises round, carbon fiber guide rails 502, 504 and measurement arms 510, 512, in conjunction with substantially rectangular stiffeners 550, which are oriented in plane and parallel to the measurement arms. Measurement arm heads 552 and 554 may be used to join the measurement arm and stiffener together at the distal or measurement end. The heads may be fabricated from any material suitably strong and stiff for the purpose. It is preferred in this embodiment that heads 552, 554 be fabricated from an aluminum alloy.

FIG. 6 illustrates an adjustable brace 650 disposed between a four carbon fiber guide rail system 602 and a carbon fiber measurement arm 610. The brace 650 is shown on only the upper measurement arm 610. It will be appreciated that when a product, such as a threaded tubular is in a horizontal position, a diameter measurement of the thread system will occur in a vertical direction. In such circumstances, the upper measurement arm 610 may carry the entire weight of the instrument 600, with the lower arm carrying little to no weight. Adjustable brace 650 can be used to prevent unwanted deflection in measurement arm 610 during vertical or near vertical measurements.

Figure 7A:
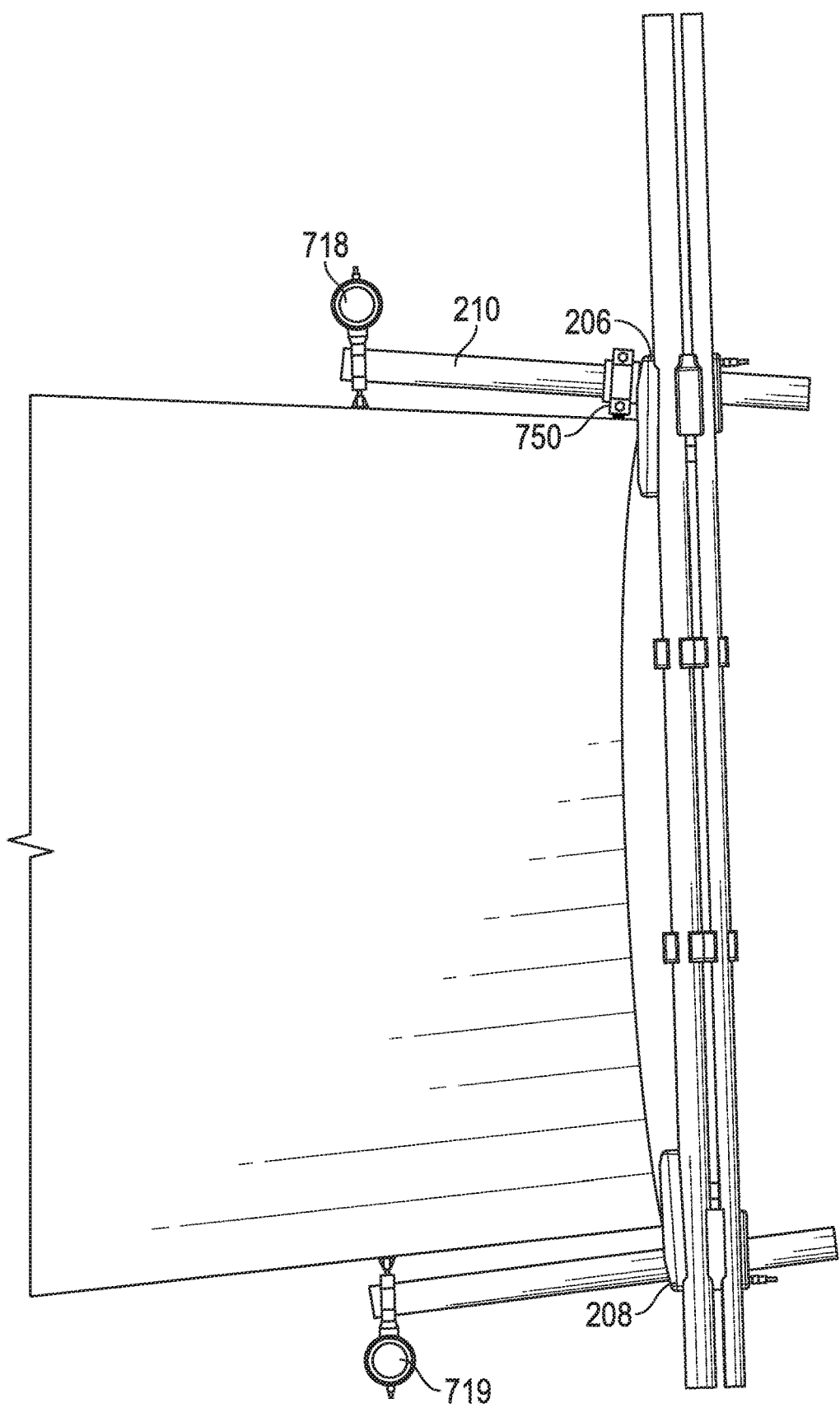
FIGS. 7A and 7B illustrate embodiments of a measurement gage having dual indicators according to one or more aspects of the inventions disclosed herein.
Figure 7B:
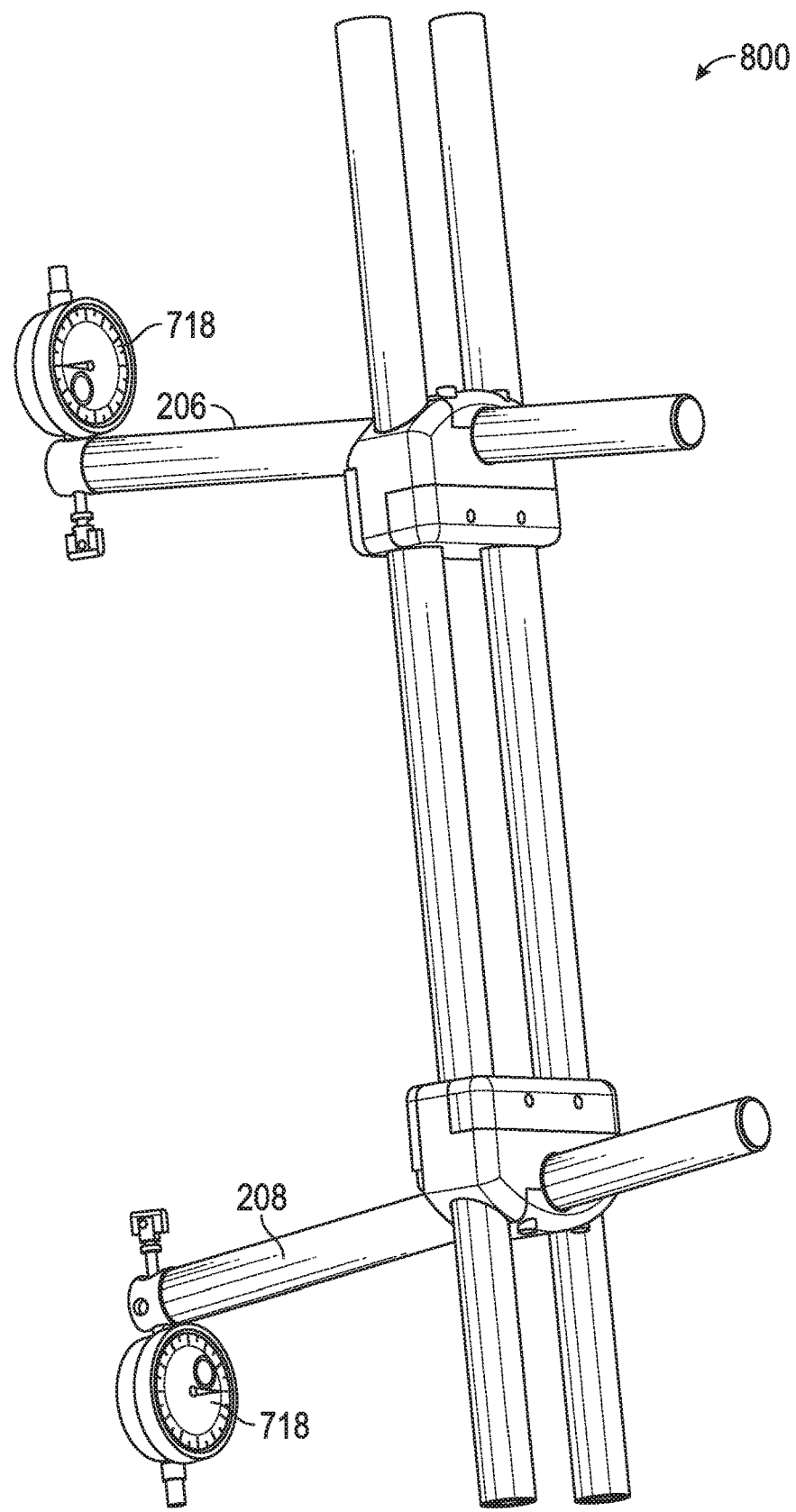

Alternately or additionally, as illustrated in FIG. 7, one or more measurement arm supports 750 may be utilized particularly when making vertical measurements on large products (e.g., 24-inch tubular products). As discussed, the size and weight of the measurement instrument itself may cause undesirable deflections in the measurement arm, which deflections may adversely affect measurement accuracy, precision, and/or repeatability. Such deflections may be eliminated by orienting the product in a vertical direction (i.e., making measurements in horizontal plane), but such orientation is not always possible. For vertical measurements (or measurements other than in a horizontal plane), such as illustrated in FIG. 7, the inventions contemplate use of a measurement arm support or vertical support 750 that is configured to support the instrument in a vertical direction at point on the measurement arm that is near to or a part of the measurement block 206, 208. In other words, the amount of cantilevered measurement arm between the block and the support is minimized, thereby minimizing deflections due to instrument weight. While the support is shown in FIG. 7 associated with the upper measurement arm it may also be associated with the measurement block 206 and configured to react against the outside surface of the product. It also will be appreciated that the support 750 may be associated with the lower block 208 or measurement arm and may be configured to react against the inside surface of the product.

Figure 8:
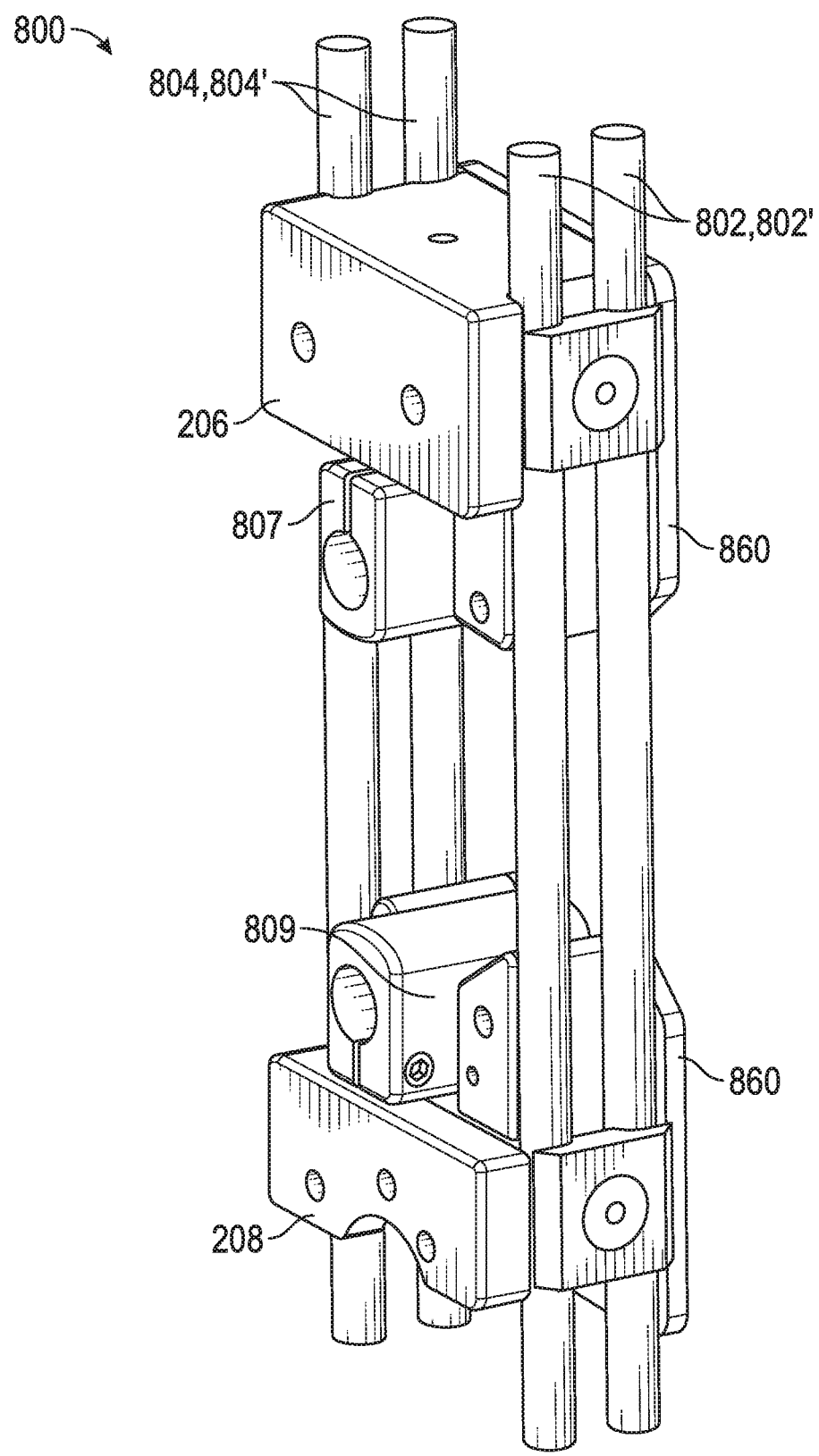
FIG. 8 illustrates another embodiment of a measurement gage having four guide rails according to one or more aspects of the inventions disclosed herein.

FIG. 7 and FIG. 8 also illustrate that the invention also may comprise dual measurement devices 718 and 719, such as dial indicators, diametrically opposed on the measurement arms 206, 208 to provide a differential diametrical measurement. It will be appreciated that a differential measurement provided by dual indicators will not be affected by deflections in the measurement arms or guide rails.

Figure 9:
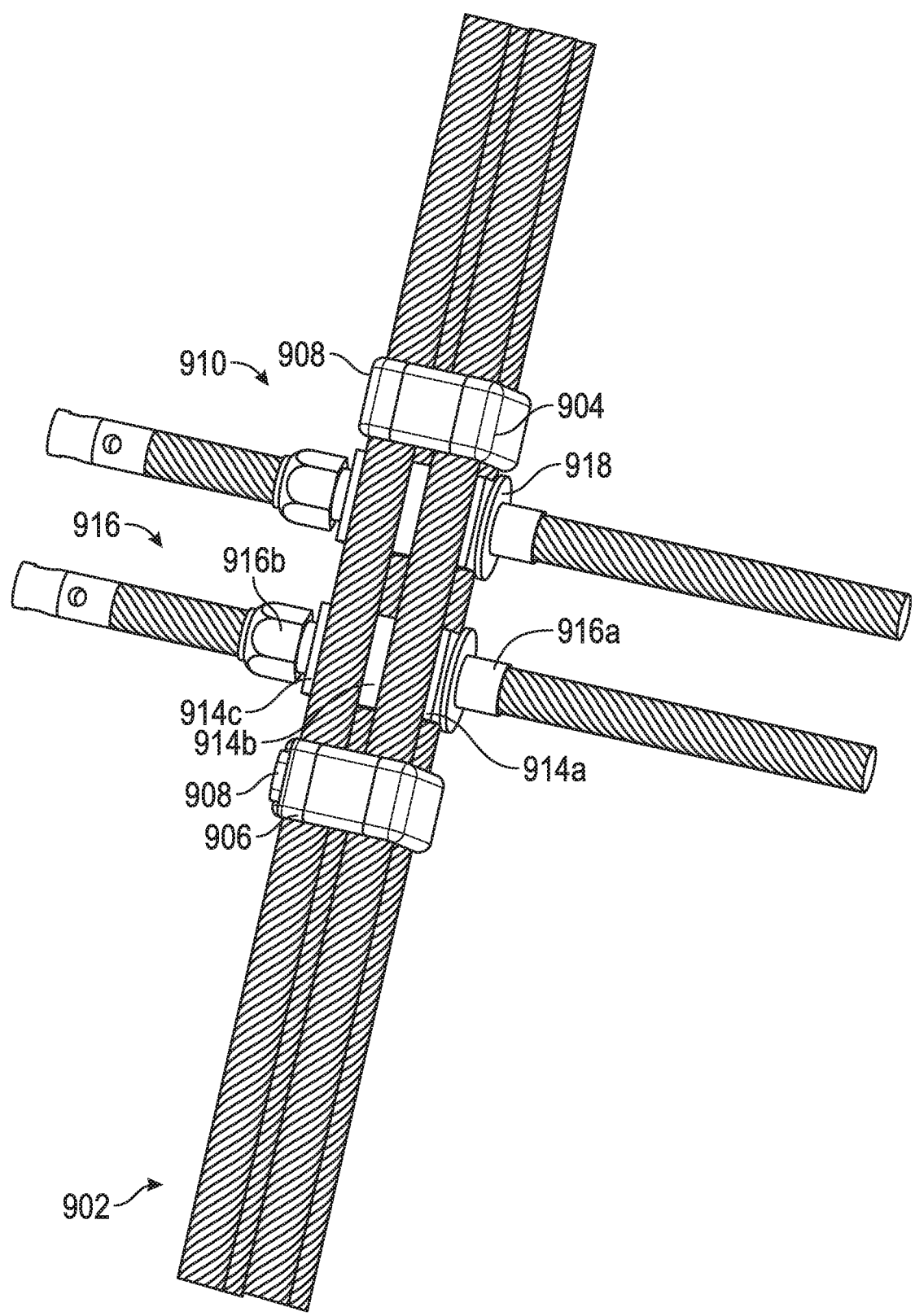
FIG. 9 illustrates another embodiment of an measurement gage having separate wear pads according to one or more aspects of the inventions disclosed herein.
Figure 10:
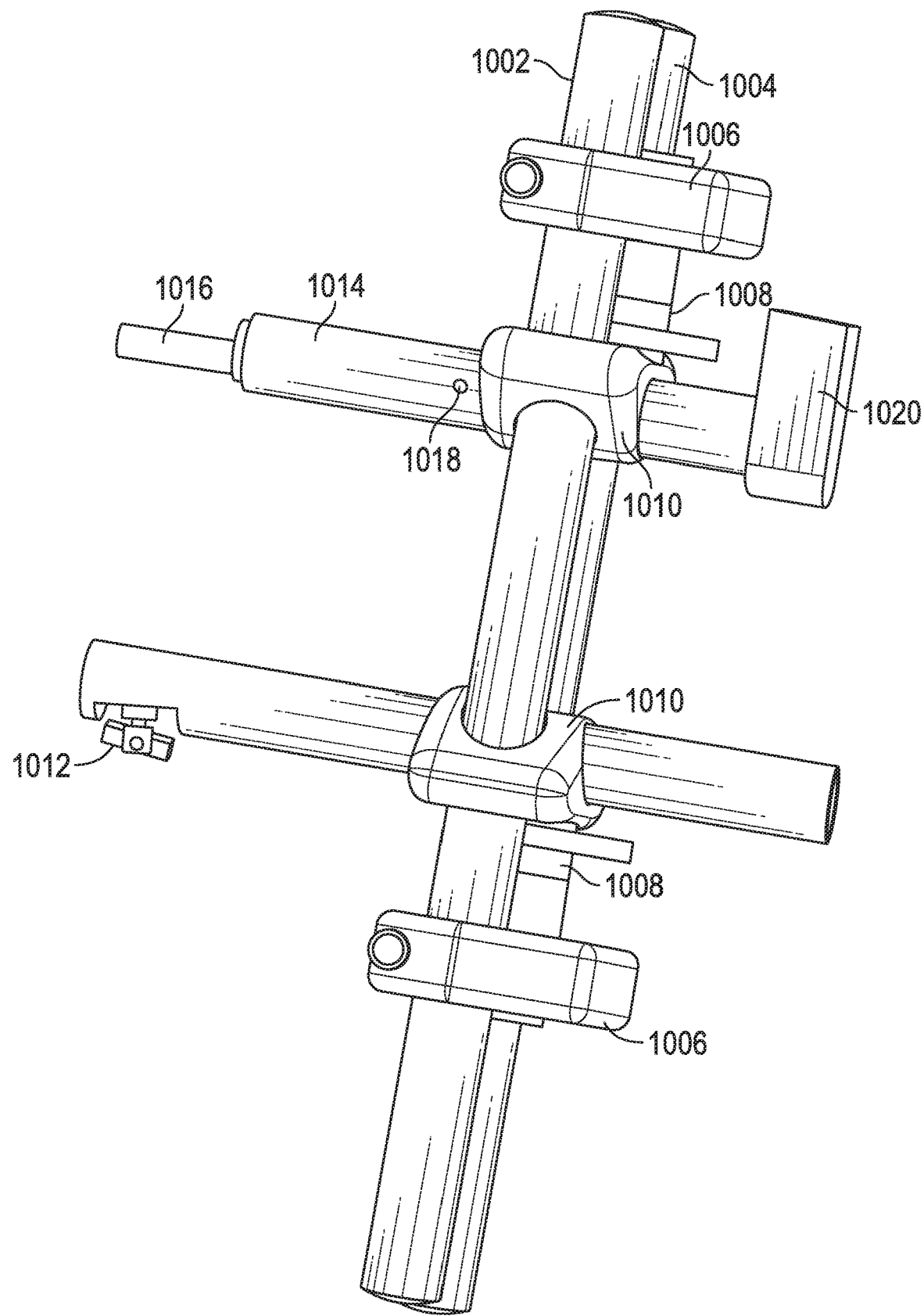
FIG. 10 illustrates yet another embodiment of an measurement gage having separate wear pads according to one or more aspects of the inventions disclosed herein.

FIGS. 8, 9, and 10 illustrate other embodiments of the present inventions. FIG. 8 discloses a four guide rail system (802, 802', 804, 804') with separate guide rail blocks 806 and 808, measurement arm blocks, 807 and 809. In this embodiment, the spatial relationship between the guide rail block (e.g., 806) and the measurement arm block (e.g., 807) can be adjusted based on, for example, the geometry of the product to be measured. The measurement arm block can be locked into position to the guide rail block by any of the clamping mechanisms discussed previously. The inventions may also comprise one or more replaceable wear pads 860 that are separate from or separable from each measurement block 206, 208. For example and not limitation, a wear pad 860 may be removably attached to both a measurement block 206 and a trolley that is configured to slide along the guide rails similarly to the block 206. When the wear pad 860 is secured to both the block 206 and the trolley, moving the block moves also moves the wear pad and trolley as a unit, and locking (such as through the compression mechanism) the block to the guide rail also locks the wear pad and trolley in position. For certain products under inspection, it may be desirable to uncouple (such as by removing fasteners) the wear pad from the block so that the wear pad/trolley assembly may be located along the guide rails independently of the block. In such embodiment, the trolley may also comprise a retention mechanism, such as the compression mechanisms discussed above.

FIG. 9 illustrates another embodiment also comprising a four guide rail system 902, a plurality of guide rail blocks with replaceable wear pads 908. A measurement arm block 910, 912 comprises spacers 914a, 914b, 914c, and lock nut 918, and collet assembly 916 comprising a sleeve 916a and nut 916b. Once the measurement arms are moved into position for the particular product, the lock nut 918 can be tightened to compress the guide rails between the spacers and lock the measurement arms in position. Once the axial extension of the measurement arms is established, the nut 916a can be tightened on the collected sleeve 918 to grip the measurement arm and hold it in place without causing irreversible damage to the arm. It will be appreciated that the embodiment shown in FIG. can utilize one or two dimensional indicators (not shown).

FIG. 10 illustrates and embodiment 1000 comprising two guide rails 1002 and 1004. A guide rail block comprises a clamping system to lock the guide rails in position and provide the desired rigidity to the guide rail system. The guide rail block also comprises a screw mechanism 1008, which is coupled to a measurement arm block that is configured to slide along the guide rails 1002, 1004. Once the guide rail blocks are locked or clamped into position, the screw mechanism can be adjusted to place the measurement arms (i.e., the measurement shoes 1012) into correct position (such by use of a standard for a particular product). The measurement arm block 1010 also may be configured to lock to the guide rails 1102, 1004, such as discussed above with the other disclosed embodiments.

FIG. 10 also discloses that the active measurement arm 1014 may comprise the measurement lever 1016 system discussed previously. As shown, the carbon fiber measurement arm 1014 is preferably hollow and a measurement lever, fabricated from, for example, an aluminum alloy, traverses the inside of the measurement arm, and is rotatably pinned 1018 to the arm at about the midpoint. The distal end of the lever may comprise a measurement shoe 1012, and the proximal end of the lever is coupled to a measurement indicator. As discussed above, it is preferred that the lever 1016 be biased into the measuring position, which in the embodiment of FIG. 10 is upward because this embodiment is configured for internal diameter measurements.

While the inventions and specific embodiment disclosed herein contemplate use of a simple analog (e.g., clock face) dial indicator, or dual dial indicators, including differential dial indicators, it is preferred that the indicator(s) be digital and configured to communicate data, such as measurement data, to a data display system and/or a data processing system. The data display/processing system can be a dedicated CPU with display associated with the measurement instrument (such as affixed to a block or to the guide rails), a smartphone, a tablet, a website or the like, and may be configured to display the measured or determined dimensional parameter, such as diameter, based on the transmitted data. The digital indicators may communicate with each other and the data processing system, or may communicate only with the data processing system, using wired or wireless protocols.

For example, the indicator(s) may be wired to a data processing and display system attached to the measurement instrument. Alternately, the indicator(s) may be wired to a data processing and transmission system attached to the measurement instrument, which then wired or wirelessly communicates the measurement, e.g., diameter, to a display, such as a smart phone, computer, or table. It may be desirable for wireless communication from the indicator(s) to the data processing/display system, and for such wireless communication to be as instantaneous as possible and with repeatable or consistent latency. Inconsistency or variability in latency or varying delay may adversely affect the accuracy of the dimensional measurements. It is presently preferred, but not required, therefore, that this transmission protocol be analog rather than digital, as digital protocols tend to have inconsistent or varying latencies, although digital protocols with sufficiently consistent latencies may be used. For purposes of this invention, the Texas Instrument chip model no. CC1101 is suitable for this one-way communication link from the indicators to the data processing/display system, and the specifications and operational characteristics are incorporated herein by reference. Alternately, the wireless communication link between the indicator(s) and the data processing/display system can utilize a digital protocol or other protocol as desired.

The data processing system may comprise error correction algorithms and may allow the operator to enter information about the setup that can affect the measured or calculated dimension or property. This information may include the product temperature, standard temperature, transducer temperature, product material, taper of the part, for example.

It will be appreciated that for a precision measurement instrument such as the disclosed inventions, it can be critical to orient accurately the blocks to the guide rail system, the measurement arms to the blocks, the wear pads to the blocks, and all to each other. It has been found and is presently preferred that the assembled instrument be oriented in a precision machine so that the wear pads attached to the instrument may be precisely ground or machined, as necessary, to accurately orient the measurement arms to the wear pads. Multiple sets of wear pads may be fabricated in this manner for a particular instrument.

Other and further embodiments utilizing one or more aspects of the inventions described above can be devised without departing from the spirit of our invention. Although multiple embodiments have been disclosed with various and different features, persons of skill having benefit of this disclosure will be able to create additional embodiments by picking and choosing various of these features. Further, the various methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention we conceived, but rather, in conformity with the patent laws, we intend to fully protect all such modifications and improvements that come within the scope or range of equivalent of the following claims.

What is claimed is:

1. A metrological instrument comprising:
   at least one cylindrical guide rail fabricated from carbon fiber reinforced composite and having an outside surface that varies in a particular dimension no more than about 0.002 inch along the length;
   first and second measurement blocks each having an aperture there through configured to receive the at least one guide rail, and each block having associated therewith a wear pad, the two wear pads defining a contact plane, at least one of the measurement blocks comprising a vertical load surface configured to react the weight of the instrument against a product to be measured;
   a guide rail retention mechanism associated with each block and configured to secure the block to the at least one guide rail at a desired position without causing irreversible damage to an outside surface of the guide rail or causing permanent variation to the particular dimension;
   a measurement arm aperture in each block configured to receive a measurement arm in substantially normal orientation to the contact plane;
   a measurement arm located in each measurement arm aperture;
   a measurement arm retention mechanism associated with each measurement arm aperture and configured to secure the measurement arm to the block at a desired position; and
   at least one dimensional indicator associated with an end of at least one measurement arm.

2. The instrument of claim 1, wherein at least one of the measurement arms comprises a vertical load surface configured to react the weight of the instrument against a product to be measured.

3. The instrument of claim 1, wherein the at least one directional indicator is a digital dimensional transducer configured to transmit data representative of a measurement from the instrument.

4. The instrument of claim 3, wherein the digital dimensional transducer configured to transmit wirelessly data representative of a measurement from the instrument to a remote location.

5. The instrument of claim 3, wherein the digital dimensional transducer configured to transmit data representative of a measurement from the instrument to a remote location via a wired connection.

6. The instrument of claim 3, wherein the directional indicator is configured to store data representative of multiple measurements before transmitting the data from the instrument.

7. The instrument of claim 1, further comprising a second dimensional indicator associated with the other measurement arm.

8. The instrument of claim 7, wherein both of the directional indicators are digital dimensional transducers configured to transmit data representative of a measurement from the instrument.

9. The instrument of claim 8, wherein the directional indicators are configured to store data representative of multiple measurements before transmitting the data from the instrument.

10. The instrument of claim 1, wherein at least one of the measurement arms comprises a measurement lever extending there through and configured to pivot within the arm about a pivot point, wherein a distal end of the lever has a measurement shoe associated therewith, and the proximal end of the lever is coupled to the dimensional indicator, and wherein the lever is biased into a measurement condition.

11. The instrument of claim 10, comprising a spring configured to bias the lever.

12. The instrument of claim 1, further comprising a stiffener associated with at least one of the measurement arms.

13. The instrument of claim 1, further comprising an adjustable brace extending between the at least one guide rail and at least one of the measurement arms.

14. The instrument of claim 1, further comprising a second guide rail, and wherein the measurement arms extend from between the guide rails.

15. The instrument of claim 1, wherein the wear pads are replaceable.

16. The instrument of claim 1, wherein the wear pads are separable from the measurement blocks and are configured to separately lock to the at least one guide rail.

17. A method of determining a diameter of a product with the instrument of claim 1, comprising:
   securing the measurement arms in the measurement blocks so that the instrument is configured to determine a diameter of the product at a predetermined position;
   calibrating the dimensional indicator with a standard;

contacting the wear pads with a datum surface on the product; and determining a diameter of the product while the wear pads contact the datum surface.

18. The method of claim 17, further comprising supporting the weight of the instrument on the product through the vertical load surface.

19. The method of claim 17, further comprising rotating the instrument about the product; and determining a diameter of the product at a second location while the wear pads contact the datum surface.

* * * * *